(12) United States Patent
Roberts et al.

(10) Patent No.: US 10,108,226 B2
(45) Date of Patent: Oct. 23, 2018

(54) CASE FOR A PORTABLE ELECTRONIC DEVICE

(71) Applicant: Tech 21 Licensing Limited, Twickenham (GB)

(72) Inventors: Jason Roberts, Twickenham (GB); Benjamin Thorpe, Uxbridge (GB); Jeremy David McManus, London, GA (US)

(73) Assignee: TECH 21 LICENSING LIMITED, Twickenham, Middlesex (GB)

(*) Notice: Subject to any disclaimer, the term of this patent is extended or adjusted under 35 U.S.C. 154(b) by 0 days.

(21) Appl. No.: 15/650,133

(22) Filed: Jul. 14, 2017

(65) Prior Publication Data

US 2018/0017991 A1   Jan. 18, 2018

(30) Foreign Application Priority Data

Jul. 14, 2016   (GB) .................................. 1612241.8

(51) Int. Cl.
*G06F 1/16*   (2006.01)
*H04B 1/38*   (2015.01)
(Continued)

(52) U.S. Cl.
CPC ............ *G06F 1/1626* (2013.01); *A45C 11/00* (2013.01); *H04B 1/3888* (2013.01);
(Continued)

(58) Field of Classification Search
CPC ....... H04B 1/3888; A45C 11/00; A45C 13/36; A45C 2011/002; A45C 2011/003;
(Continued)

(56) References Cited

U.S. PATENT DOCUMENTS

| | | | | |
|---|---|---|---|---|
| 8,457,701 | B2* | 6/2013 | Diebel | H04B 1/3888 206/701 |
| 8,755,852 | B2* | 6/2014 | Hynecek | A45C 11/00 455/575.8 |

(Continued)

FOREIGN PATENT DOCUMENTS

| | | |
|---|---|---|
| GR | 20130100328 | 1/2015 |
| KR | 101335762 | 12/2013 |
| KR | 101564851 | 10/2015 |

OTHER PUBLICATIONS

European Search Report for GB1612241.8, dated Nov. 18, 2016.

*Primary Examiner* — Pablo Tran
(74) *Attorney, Agent, or Firm* — Stephen J. Weyer; Stites & Harbison, PLLC.

(57) ABSTRACT

A case for holding portable electronic devices of variable sizes. The case extends around five sides of the device. The case comprising a back panel (1) and four side panels (2) extending away from the back panel. At least one of the side panels comprises a plurality of flexible protrusions (6) extending inwardly at an angle other than 90° from the at least one side panel, the protrusions (6) being capable of deforming inwardly by at least 0.5 mm. The side panels (2) comprise an inwardly facing flexible lip (8) formed at the end of the side panels (2) away from the back panel, the lip being angled towards the back panel (5) of the case.

19 Claims, 2 Drawing Sheets

(51) Int. Cl.
*H04M 1/00* (2006.01)
*A45C 11/00* (2006.01)
*H04M 1/18* (2006.01)
*H04B 1/3888* (2015.01)

(52) U.S. Cl.
CPC ... *A45C 2011/002* (2013.01); *A45C 2011/003* (2013.01); *G06F 2200/1633* (2013.01)

(58) Field of Classification Search
CPC ........ G06F 1/1633; G06F 1/16; G06F 1/1626; H04M 1/0202; H04M 1/185; H04M 1/0283; H04M 1/00; H04M 1/18; H04M 1/02
See application file for complete search history.

(56) References Cited

U.S. PATENT DOCUMENTS

| | | | |
|---|---|---|---|
| 9,008,738 B1* | 4/2015 | Dong | A45C 11/00 455/575.1 |
| 9,182,785 B2* | 11/2015 | Wyner | A45C 11/00 |
| 9,503,147 B2* | 11/2016 | Witter | H05K 5/03 |
| 9,590,684 B2* | 3/2017 | Poon | H04B 1/3888 |
| 2013/0027862 A1* | 1/2013 | Rayner | H01H 13/06 361/679.3 |
| 2015/0068935 A1* | 3/2015 | Kay | A45C 13/36 206/320 |

\* cited by examiner

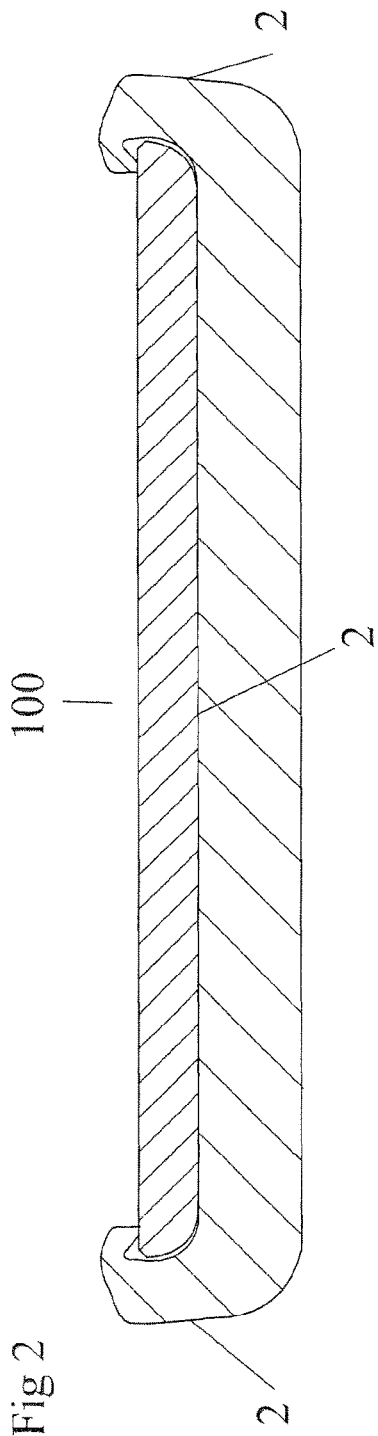
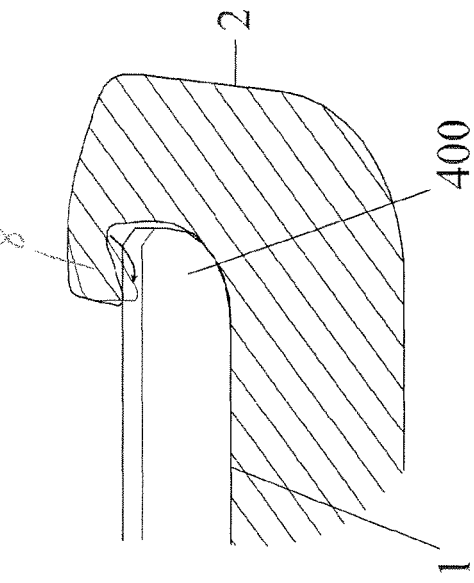
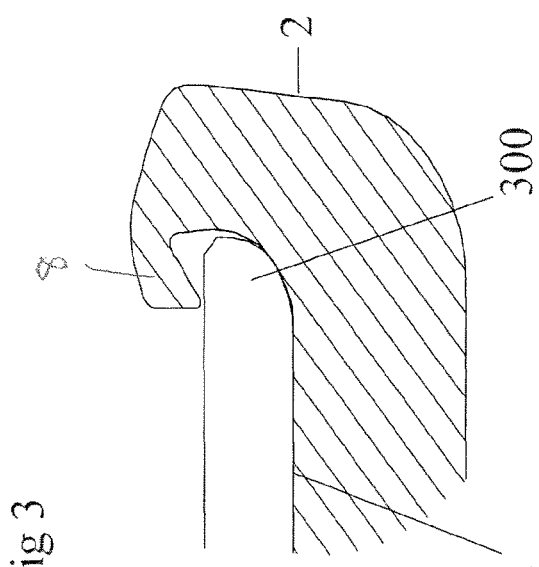

CASE FOR A PORTABLE ELECTRONIC DEVICE

The present invention relates to a case for a portable electronic device with a screen. This may be a smart phone, e-reader, tablet, satellite navigation system or the like.

It is known to provide cases for portable electronic devices in order to provide additional impact and/or scratch protection for portable electronic devices. Typically, these cases are shaped to securely fit a particular single model of portable electronic device.

Cases adapted to accommodate multiple models of portable electronic devices typically comprise a back panel, with elasticated loops configured to hold the portable electronic device. Such cases typically do not extend substantially around the four side portions of the computer and as such offer little protection. Additionally, these elasticated loops may not be particularly secure as the elastic may fail or stretch over time.

The present invention provides a case for holding a portable electronic device by extending around five sides of the device, the case comprising a back panel and four side panels extending away from the back panel, wherein: at least one of the side panels comprises a plurality of flexible protrusions extending inwardly at an angle other than 90° from the at least one side panel, the protrusions being capable of deforming inwardly by at least 0.5 mm; and the side panels comprise an inwardly facing flexible lip formed at the end of the side panels away from the back panel, the lip being angled towards the back panel of the case.

The flexible protrusions are able to deflect by a significant amount in the context of a case of this type thereby allowing devices of different lateral dimensions to be accommodated. The angled lip is then configured to readily accommodate devices or different thicknesses.

The protrusions in their undeformed state may protrude less than the lip such that they are not directly visible from above. However, preferably, the protrusions in their undeformed state project inwardly to a greater extent than the lip. With such an arrangement, the protrusions are designed to be deformed even with a smaller device thereby maintaining a resilient gripping force even on the smaller device.

Preferably, the flexible lip and the flexible protrusions are independently flexible. This allows the dimensions of the device to be independently altered.

The protrusions may be configured to deform by being compressed. However, preferably they are configured to be deformed by being deflected.

Preferably, the flexible protrusions extend at an angle of at least 45° from the side panel.

Preferably, the flexible protrusions are formed on only one of the side panels.

Preferably, the case is rectangular and the flexible protrusions are formed on one of the short sides of the rectangle. Typically the length of the devices is the most varied dimension.

Preferably, the flexible protrusions are deformable by at least 1 mm.

In certain embodiments the flexible lips are angled at least 20° towards the back panel, preferably at least 30° towards the back panel.

Preferably, the flexible lips vary in thickness along their length, the flexible lips being thinner towards the side panel and thicker towards the free end.

The invention will now be described in detail, by way of example only, with reference to the accompanying drawings in which:

FIG. 2 is a section view of the adjustable case of FIG. 1;

FIG. 3 is an enlarged view of an end portion of the adjustable case of the section view of FIG. 2, containing a first portable electronic device; and FIG. 4 is an enlarged view of an end portion of the adjustable case of the section view of FIG. 2, containing a second portable electronic device.

Figure 1:
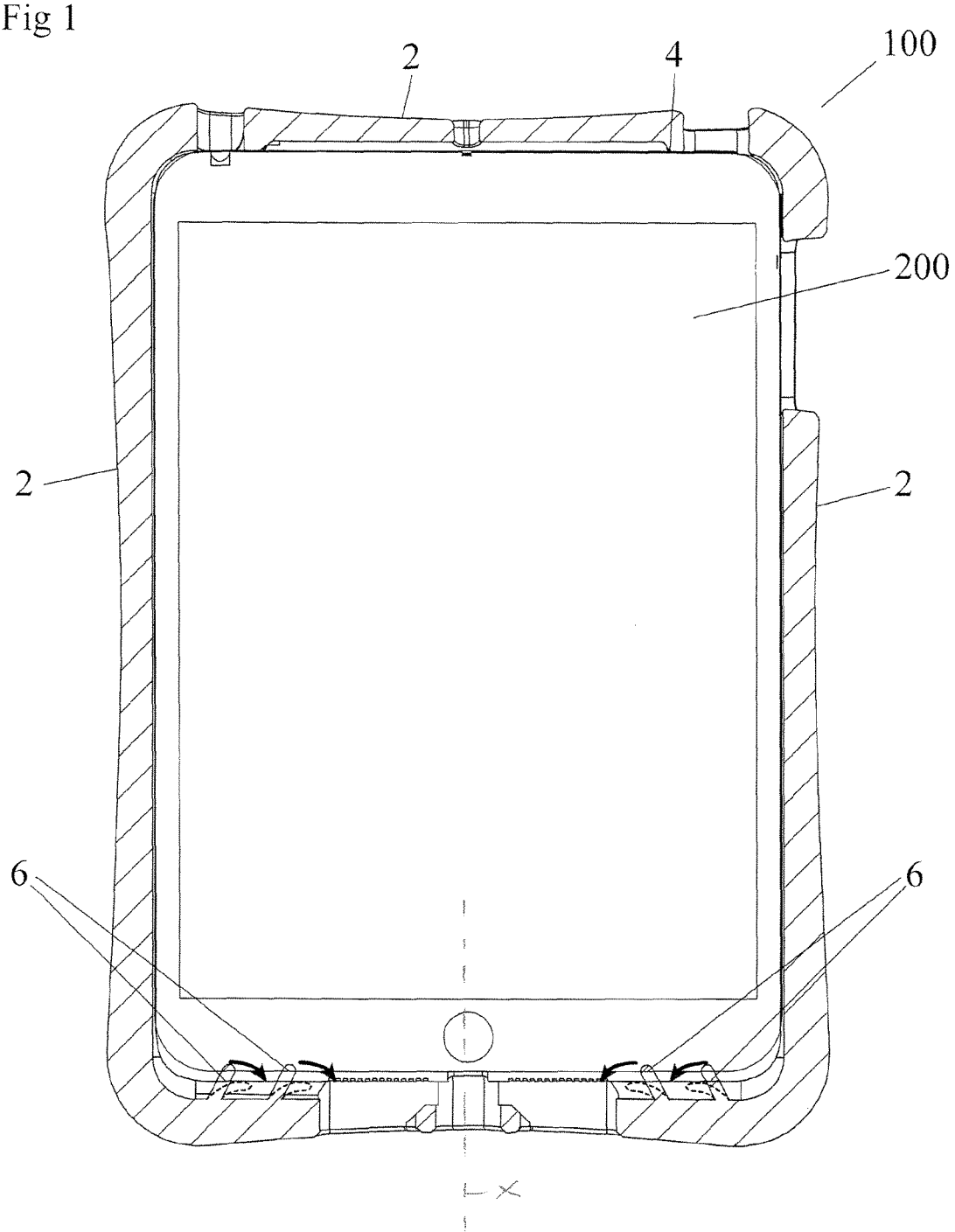
FIG. 1 is a top view of an adjustable case for a portable computer device according to one embodiment of the present invention.

An embodiment of the present invention is shown as the case 100 of FIGS. 1 to 4. The case 100 comprises a back panel 1, with four side panels 2 extending substantially perpendicular from the back panel 1. The back panel 1 and four side walls 2 define a cavity 4 for receiving a portable electronic device 200.

The inner wall of at least one of the side panels 2 is provided with a plurality of inwardly extending protrusions 6. The protrusions 6 are angled towards a central axis X of the case 100. In particular, the protrusions may form an angle of approximately 60° with the inner wall of the side panel 2 which they extend from. The protrusions 6 are flexible and may be deflected towards the inner wall of the side panel 2 which they extend from. In alternative embodiments the protrusions 6 may be angled away from a central axis X of the case, or may be parallel to the central axis.

Each protrusion 6 has at its distal end a contact portion, for contacting with the portable electronic device. As the protrusion 6 are flexed, different sized portable electronic devices 200 may be fitted within the cavity 4.

Alternatively, or in addition, protrusions could be provided on one or more of one of the long side walls 2 of the cavity, or on both short side walls 2 of the cavity, or any combination thereof.

The section view of FIG. 2 shows how the present adjustable case 100 may deal with varying thicknesses of portable electronic device, while still extending around five sides of the portable electronic device.

The side walls 2 are provided with lip portions 8 at the end of the side walls 2 away from the back panel 1 which extend inwardly from the side wall 2 and are configured to engage with the front surface of the portable electronic device. The lip portions 8 are flexible and are angled towards the back panel 1. As the lip portions 8 are flexed towards and away from the back panel 1, the thickness of the cavity 4 may be altered to accommodate different sized devices.

FIG. 3 shows a first portable electronic device 300 inside a case 100. The lip portions 8 are deformed a first amount to adjust the cavity 4 depth according to the thickness of the first portable electronic device 300. The first amount of deformation may be a relatively small amount, or may be substantially undeformed.

FIG. 4 shows a second portable electronic device 400 inside a case 100 according to the present invention. The second portable electronic device 400 is thicker than the first portable electronic device 300. The lip portions 8 are deformed by a second amount, greater than the first amount, in order to adjust the cavity 4 depth according to the thickness of the second.

As such, the same case 100 may be used to hold multiple portable electronic device 300, 400 which vary in thickness and/or in length and/or in width, whilst still holding the portable electronic device 200, 300 securely and extending substantially around five sides of the portable electronic device 200, 300.

The invention claimed is:

1. A case for holding a portable electronic device by extending five sides of the device, the case comprising a back panel and four side panels extending away from the back panel, wherein:
    at least one of the side panels comprises a plurality of flexible protrusions extending inwardly at an angle other than 90° from the at least one side panel, the protrusion being capable of deforming inwardly by at least 0.5 mm, the flexible protrusions arranged to be deformed by deflection; and
    the side panels comprise an inwardly facing flexible lip formed at the end of the side panels away from the back panel, the lip being angled towards the back panel of the case.

2. The case according to claim 1, wherein the flexible lip and the flexible protrusions are independently flexible.

3. The case according to claim 2, wherein the flexible protrusions are arranged to be deformed by deflection.

4. The case according to claim 1, wherein the flexible protrusions extend at an angle of at least 45° from the side panel.

5. The case according to claim 2, wherein the flexible protrusions extend at an angle of at least 45° from the side panel.

6. The case according to claim 1, wherein the flexible protrusions extend at an angle of at least 45° from the side panel.

7. The case according to claim 3, wherein the flexible protrusions extend at an angle of at least 45° from the side panel.

8. The case according to claim 1, wherein the flexible protrusions are formed on only one of the side panels.

9. The case according to claim 4, wherein the case is rectangular and the flexible protrusions are formed on one of the short sides of the rectangle.

10. The case according to claim 5, wherein the case is rectangular and the flexible protrusions are formed on one of the short sides of the rectangle.

11. The case according to claim 6, wherein the case is rectangular and the flexible protrusions are formed on one of the short sides of the rectangle.

12. The case according to claim 7, wherein the case is rectangular and the flexible protrusions are formed on one of the short sides of the rectangle.

13. The case according to claim 1, wherein the flexible lips are angled at least 20° towards the back panel, preferably at least 30° towards the back panel.

14. The case according to claim 1, wherein the flexible lips vary in thickness along their length, the flexible lips being thinner towards the side panel and thicker towards the free end.

15. The case according to claim 1, wherein the protrusions in their undeformed state project inwardly to a greater extent than the lip.

16. The case according to claim 1, wherein the flexible protrusions are capable of being deformed inwardly by at least 1 mm.

17. The case according to claim 2, wherein the flexible protrusions are formed on only one of the side panels.

18. The case according to claim 1, wherein the flexible protrusions are formed on only one of the side panels.

19. The case according to claim 3, wherein the flexible protrusions are formed on only one of the side panels.

* * * * *